Aug. 22, 1944.    G. A. HUGHES    2,356,320
ARC WELDING EQUIPMENT
Filed March 29, 1943    3 Sheets-Sheet 1

INVENTOR
GROVER A. HUGHES
BY
Cook & Robinson
ATTORNEY

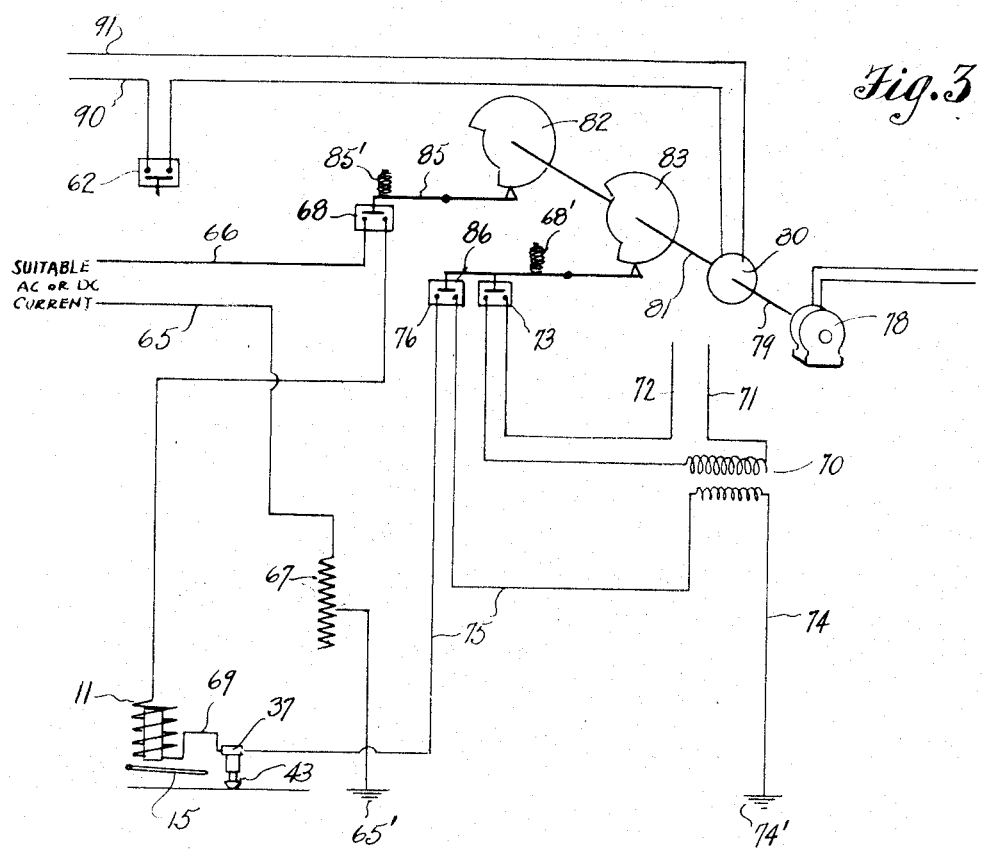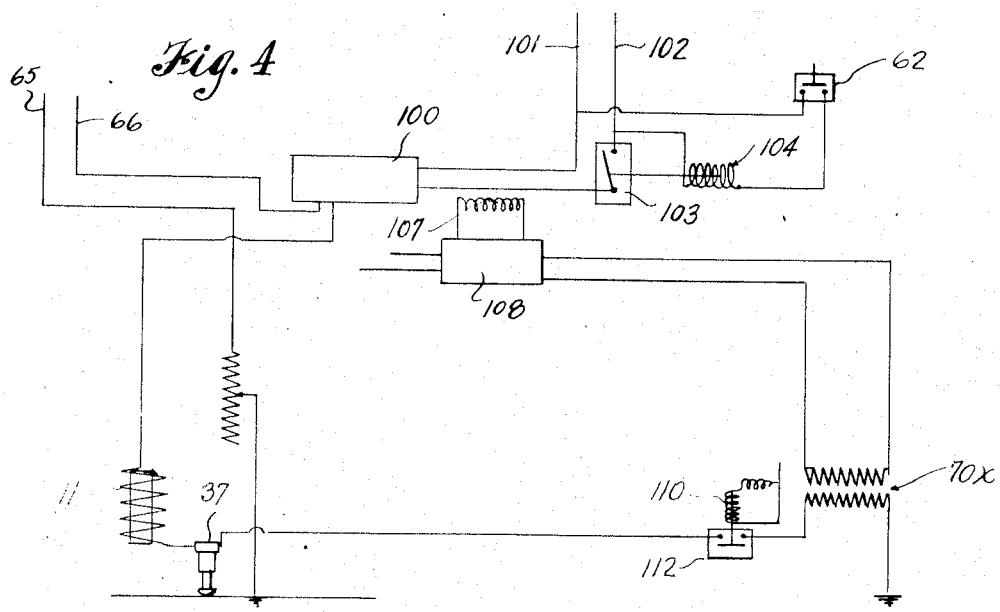

Aug. 22, 1944. G. A. HUGHES 2,356,320
ARC WELDING EQUIPMENT
Filed March 29, 1943 3 Sheets-Sheet 3

INVENTOR
GROVER A. HUGHES
BY
Cook & Robinson
ATTORNEY

Patented Aug. 22, 1944

2,356,320

UNITED STATES PATENT OFFICE 2,356,320

ARC-WELDING EQUIPMENT

Grover A. Hughes, Seattle, Wash., assignor of one-third to Robert W. Hughes and one-third to Roger G. Hughes, both of Seattle, Wash.

Application March 29, 1943, Serial No. 480,939

11 Claims. (Cl. 219—4)

This invention relates to arc welding equipment and it has reference more particularly to improvements in devices known in the art as "stud welding guns" and the electric circuits and circuit control devices used in connection therewith; it being the principal object of this invention to provide improvements in welding gun equipment whereby to reduce the size thereof as a means of facilitating handling and to better adapt such guns to the welding of studs in corners or close quarters. Also, to provide novel control circuits and devices whereby the stud will be seated gently in the pool of molten metal while the welding arc is still flowing.

Explanatory to this invention, it will be here stated that in the usual use of welding guns of this general character for the end welding of studs or bolts to plates, structural members, and the like, large current is used for a short interval of time especially for vertical and overhead welding. By the use of special ferrules about the studs, the molten metal can be retained against the action of gravity and welds can be satisfactorily made in vertical and overhead positions. However, ferrules are quite costly, and therefore their use increases the cost of such welding operations accordingly, and slows up the operation, and this indirectly adds to the cost of operations.

In the use of many present-day types of welding guns wherein the stud is held by the gun, it is the general practise to establish an arc between the stud and work by first bringing the stud against the work, then closing a contactor that causes current to flow through the stud to the work, and while this current is flowing, to lift the bolt or stud to a predetermined distance from the plate to ionize a path that initiates the arc between the stud and plate.

Another method frequently employed is to touch the stud as held by the gun, to metal filings which contact the work. This results in an inrush of current through the stud during which time the welding generator is short circuited. This inrush of current during the shorting period, using a 400 ampere D. C. generator, is approximately 950 amperes, which results in the tendency of the stud to fuse and solidify, causing it to freeze to the work and making it extremely difficult to lift or withdraw for the purpose of establishing the welding arc. Sometimes, due to such sticking, instead of the stud being lifted from the work, it is merely withdrawn from its holder and this results in that undesirable arcing between stud and holder that damages both of these parts. Furthermore, such a great inrush of current as above mentioned is not desirable in the welding operation since it results in heating the welding generator and lines.

To my knowledge, there are no commercial, direct current welding generators now made or available for use that have electrical characteristics suitable for arc welding with current values such as are required for the overhead or vertical welding of ⅜" studs. Direct current arc welders of the 400 ampere rating with suitable characteristics are far below this value. However, to obtain the required current values, I have found that by arranging machines of similar characteristics, in parallel, currents of much higher value are obtained and whereby studs of ½" diameter and larger can be successfully welded both in vertical and overhead positions and using fully automatic welding guns. Direct current welding generators with drooping voltage characteristics are very difficult to keep parallel and furthermore, maintenance on such installations is very high. Also, floor space required for such machines is large, the investment in equipment is high and the equipment is bulky, heavy and requires much time to move from place to place. In such work, it is not desirable to extend long leads, and it is not possible to set such large equipment in compartments below decks on ships.

The approximate number of studs welded in an eight hour turn is two thousand. The time required to weld a stud is the arcing time plus the time current is flowing from the instant the stud is forced into the molten pool until the welding current is interrupted. Allowing for sluggish action of control contactors in the welding circuit, during the eight hour turn, current flows approximately a total of ten minutes of time and as this is spread evenly over the whole period of eight hours, it is evident that a very small transformer could be used for A. C. arc welding, and such would be practical and easy to move from compartment to compartment, and all leads carrying heavy current could then be kept relative short.

While heretofore it has been the general practice to use contactors in the welding leads for controlling the welding current, such contactors as have been used are large, expensive and sluggish. However, by using an alternating current arc welder, the contactor or timing device can be inserted in the primary circuit, thus reducing its required size and obtaining better timing of the arcing period. However, if a direct current is desired for welding, a rectifier can be used with the alternating current transformer supplying direct current to the stud with the contactors and timing device or electronic tubes in the primary of the welding transformer.

Therefore, it has been one of the objects of this invention to overcome many of the objectionable features in welding gun operation above mentioned by use of a special alternating current arc welding transformer that is designed to carry a heavy current for a short period of time for maximum current output in combination with an automatic welding gun using high frequency or a pilot arc to start the welding arc, thus to eliminate any undesirable inrush of high current; the contactor or electronic tubes then being located in the primary circuit of the welding transformer for control of the arcing period.

Another object of this invention is to improve the gun by the provision of means whereby the head of the stud will be applied gently to the molten pool at the end of the arcing period, as distinguished from the usual violent application, thus to allow the molten metal in the pool to better solidify with the liquid metal of the stud to form a perfect weld.

Still further objects of the invention reside in the novel features of construction and combination of parts and in the various modifications in parts and in circuits and controls as herein shown and described.

In accomplishing these and other objects of the invention, I have provided the improved details of construction, the preferred forms of which are illustrated in the accompanying drawings, wherein—

Fig. 3 is a wiring diagram of the various circuits of the control devices employing mechanically operated timing mechanism.

Fig. 4 is a wiring diagram showing as an alternative, use of electronic tube timing means.

Figure 1:
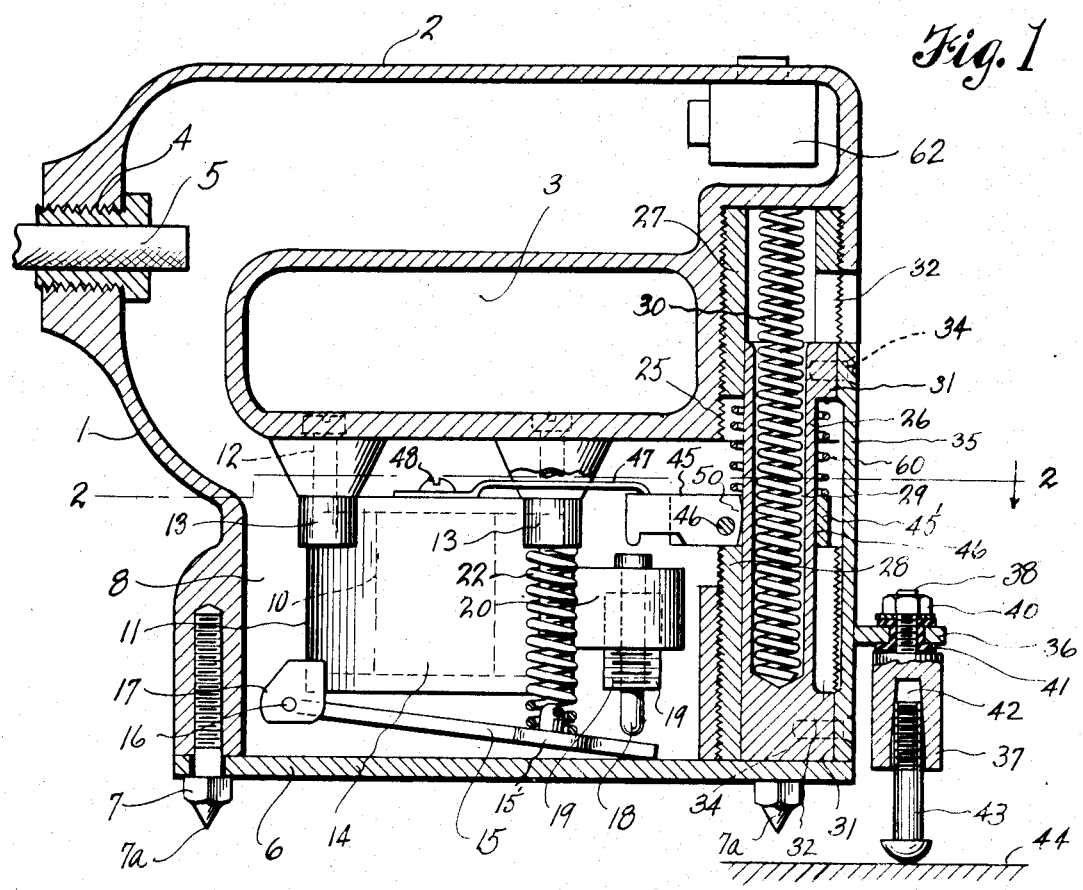
Fig. 1 is a vertical sectional view of a welding gun embodying the improved features of the present invention.
Figure 2:
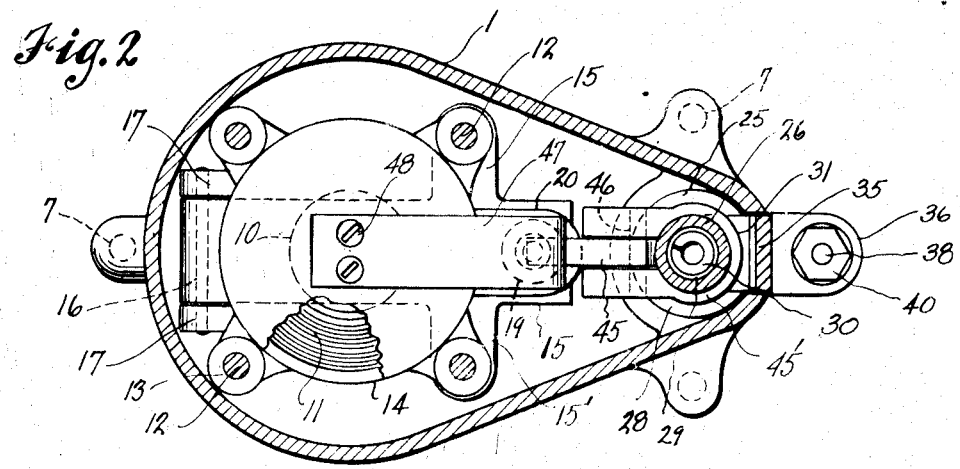
Fig. 2 is a cross section of the same taken on line 2—2 in Fig. 1.
Figure 7:
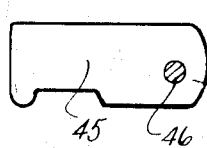
Fig. 7 is a detail of the lifting clutch lever.

Referring more in detail to the drawings, first with reference to Figs. 1, 2 and 3:

In the welding gun illustrated in Fig. 1, 1 designates, in its entirety, a frame or housing equipped at the top side with a handle portion 2 formed with a thorough passage 3 providing a hand hold portion for easy gripping of the device. The handle as well as the body portion of this housing, is hollow, and at one end, the handle portion has an opening 4 for the entry of a shielded cable 5 in which the circuit and connecting lines are encased. The bottom side of the hollow housing is closed by a flat, removable cover plate 6 held in place by bolts 7 and these, as here shown, are equipped with pointed heads 7a for non-skidding contact with the plate to which the stud is to be applied.

Fixed within the bottom chamber 8 of the housing 1 is a solenoid including a core 10 and surrounding coil 11. The solenoid is fixed in place by bolts 12 that are extended down through openings in the top wall of the chamber 8 and are threaded into lugs 13 extended laterally from the solenoid case 14. By reference to Fig. 2, it is observed that two of the bolts 12 are in transverse alignment and have end portions extended below the lugs 13 through which they are threaded to serve as spring retainers, as will later be described and understood.

Underlying the solenoid, diametrically of the core 10, is an armature bar 15, pivotally supported at one end by pivot pin 16 held in lugs 17 on the solenoid case. The other end of the bar extends beyond the armature for lifting contact with the lower end of a clutch operating pin 18 that is vertically slidable in a guide 19 held in a lug 20 that extends forwardly from the solenoid case 14. Coiled springs 22 are mounted about the lower end portions of the bolts 12 and are held under compression between the lugs through which the bolts extend and lateral wings 15' of the armature bar. When the solenoid is energized, the armature bar is lifted and will engage and lift the clutch pin 18. When the solenoid is deenergized, the springs 22 move the armature down against the bottom plate 6 and the pin 18 moves to its lower limit as determined by the engaging of its head portion with the lug 20.

Formed vertically in the forward portion of the housing 1 is an elongated vertical chamber 25 containing a plunger 26 lengthwise thereof which is guided in its movement in guide bearings 27 and 28 fitted respectively in the upper and lower ends of the chamber. This plunger has an axial bore 29 leading downwardly therein from its upper end in which a coiled spring 30 is confined under compression, bearing against the upper end of the chamber to urge the plunger downwardly to its limit of travel against the bottom plate. The plunger is cylindrical but is held against rotation in its guides by the provision of laterally extended lugs 31—31 therein which are adapted to travel in guide slots 32 in the end bearings. These lugs 31—31 are located at opposite ends of the plunger and extend through the slots to the front side of the housing. Fixed to the lugs, by screws 34, is a plate 35, and fixed to and extending forwardly from the plate is a flat lug 36 by which the stud holder 37 is carried.

This holder 37 comprises a circular metal piece with a threaded shank 38 extended from its upper end through an opening in the lug 36 and is fixed in the latter by a nut 40. An insulating collar 41 surrounds the shank and electrically insulates the holder from the housing and plunger. In the under side of the stud holder 37, is a socket 42, somewhat tapered, into which the shank of the stud or bolt is projected and frictionally held; such a stud being designated by numeral 43, and in Fig. 1, it is shown as engaged with a plate designated at 44.

Mounted in the housing, just above the upper end of the lower guide bearing 28, is a clutch and brake comprising a horizontally extending clutch lever 45 and collar 45'. The collar has a cylindrical bore through one end in which the plunger is extended and through which it will slide freely. At one side, the collar is slotted or split, and disposed therein is one end portion of the lever 45, pivotally mounted on a pivot pin 46. The lever 45 extends horizontally and at its end opposite that which is contained in the collar, rests upon the upper or head end of the pin 18 and is yieldingly held thereagainst by a leaf spring 47 that is fixed to the top wall of the solenoid housing by screw 48. It is to be observed, by reference to Fig. 1, that the pivoted end of lever 45 is formed with a clutch head 50 with a cam surface 50' which frictionally contacts the plunger and which, upon the lifting of the lever by the pin 18, will grip the plunger and lift it accordingly. This clutch head releases with the removal of the lifting pressure exerted by pin 18 on the lever and by reason of its frictional contact operates as a brake to retard the downward driving action of the spring 30 whereby the stud is seated, thus easing the forcing of the head onto the pool of metal. A coiled spring 60 surrounding the plunger between the collar 45' and lower end surface of the upper guide bearing 27, operates to release the clutch lever from the plunger when the solenoid is de-energized, thus causing the spring 30 to move the plunger downwardly.

Within the handle portion of the housing is a circuit control switch 62 which determines the starting of a cycle of operations, and the function of this switch is shown diagrammatically in Fig. 3. In the wiring diagram of Fig. 3, 65 and 66 designate supply lines for a suitable flow of A. C. or D. C. current. Line 65 is grounded to work at 65', through a variable resistance indicated at 67. Line 66 connects through normally open switch 68 with one end of the solenoid coil 11 which, at its other end, is grounded by connection 69 to the stud holder 37. The A. C. welding transformer is indicated at 70, and the primary of this is supplied with suitable current through lines 71—72 under control of normally open switch 73. One side of the secondary of the transformer is grounded through line 74 to work at 74' and the other side is connected by line 75 with the stud holder 37 through a normally open switch 76.

Mechanical means for control of the operation comprises a constant speed motor 78 having its drive shaft 79 adapted to be connected by magnetic clutch 80 with a rotatably mounted shaft 81 on which adjustable cams 82 and 83 are fixed. These cams, respectively, control the movement of pivoted switch operating levers 85 and 86 for the timed closing of the switch 68 and the switches 73 and 76.

The magnetic clutch 80 is supplied with suitable A. C. or D. C. operating current through lines 90 and 91 under control of the normally open handle contained switch 62.

With the parts and circuits so arranged, the cycle of operation is as follows:

First, a stud 43 is inserted, as shown, into the socket of stud holder 37. Then the operator presses the stud head against the plate until the three legs of the gun contact with the plate. This lifts the plunger 26 in the housing against the pressure of spring 30, and in this movement, the plunger slides freely through the collar 45'. Now that the gun is ready to weld, the operator closes switch 62, thus energizing the magnetic clutch 80, causing the constant speed motor 78 to turn the cam mounting shaft 81. The cam 82 is so adjusted and designed that its operating interval will release the lever 85 to permit it to be moved by spring 85' to close switch 68, thus to energize the solenoid, and lift the armature 15 which, in turn, lifts the pin 18 and lever 45, which latter grips and lifts the plunger accordingly to lift the stud from the plate an exact, predetermined distance. As the solenoid coil 11 is in series with the resistance 67, an arc is thus established between the stud and plate.

An instant after the closing of switch 68, the switch lever 86 is released for movement by cam 83 and a spring 68' operates thereon to close the switches 73 and 76. This causes energization of the primary of welding transformer 70 and causes welding current to flow through the secondary to the stud, thence to the work.

The operating interval of cam 82 is set for a predetermined interval of arcing time, then the switch 68 is opened thereby, de-energizing the solenoid, releasing the lever 45 and allowing the plunger to be moved downwardly by spring 30 to seat the stud head in the pool of molten metal on the plate while still arcing. Then the cam 83 operates to open switches 73 and 76 to interrupt the welding circuit. Then switch 62 is opened and the magnetic clutch becomes de-energized and the cams come to rest in readiness for another cycle to be started by closing switch 62. It will be understood that with the motor 78 running at constant speed, the arcing interval will always be constant.

Fig. 4 illustrates diagrammatically, an arrangement of parts and circuits when timing is accomplished by an electronic tube timer. In this diagram it is to be observed that there is an electronic tube timer 100 of commercial form interposed in the circuit connection 66 in lieu of switch 68. This is supplied with current through wires 101 and 102 under control of switch 103. A relay coil 104 is connected with the circuit wires 101 and 102 through switch 62 and the relay closes the switch 103 when energized upon closing switch 62. Electronic tube timer 100 is set for a definite number of cycles. Coil 11 will then be energized, establishing the pilot arc between stud and plate. As the current flows, the current relay 107 closes and the electronic timer 108 energizes the primary of the welding transformer 70x and current relay 110 closes the switch 112 in the circuit of the secondary of the welding transformer, thus causing welding current to flow from stud to work. The electronic timer 100 opens the pilot arc circuit and the stud is then gently lowered in the molten pool, while timer 108 opens the welding circuit and the cycle is completed.

Figure 5:
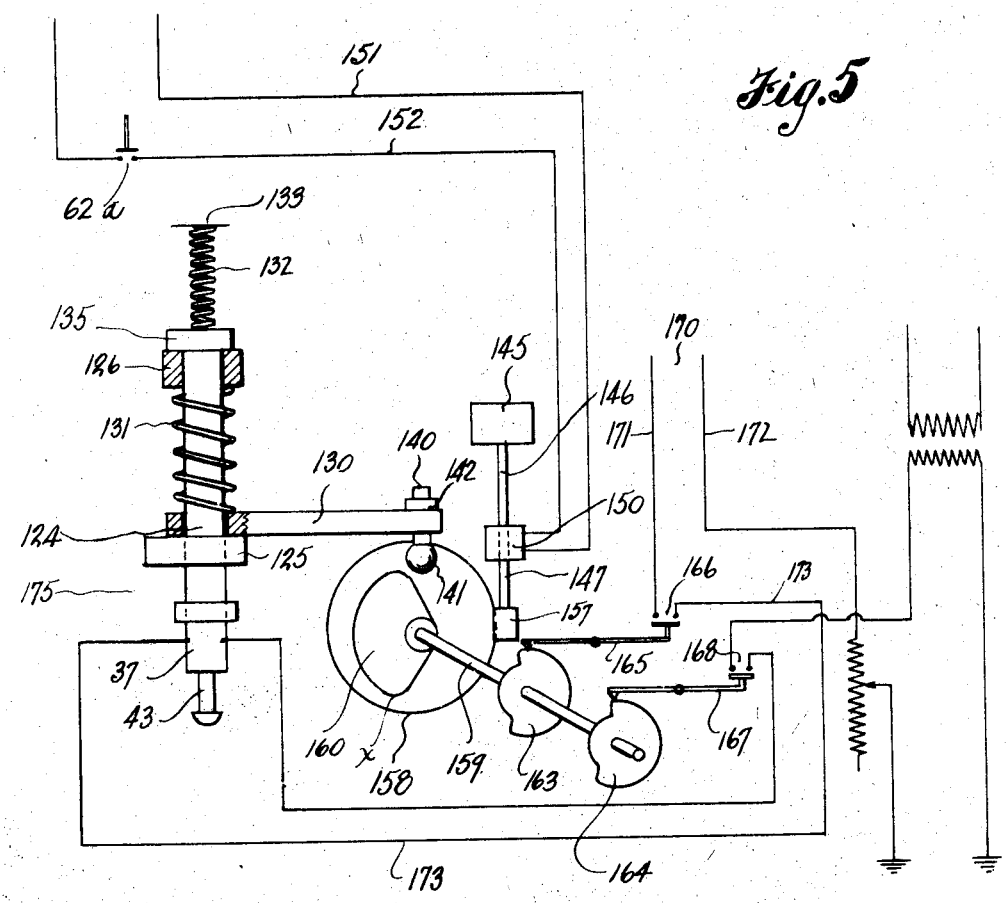
Fig. 5 is a diagrammatic illustration of still another method and means for obtaining control of the variables in stud welding operations.

In Fig. 5, I have diagrammatically illustrated another mechanism for obtaining the proper or a desired control and timing of circuits and stud lifting means in a welding gun employing an electric motor in the gun as the source of energy for the actuation of timer mechanism. In this illustration, applicable to a gun employing parts corresponding to those of many present-day types of guns, a stud 43 is indicated as being held in the socket of a holder 37; the holder being mounted on and insulated from a plunger 124 that is longitudinally slidable in spaced bearings 125 and 126 which are formed in or contained in the gun housing, not shown in its entirety herein.

It is to be understood that the plunger is adapted to be lifted to a predetermined distance for lifting the stud to initiate the arc, as was explained in connection with the gun of Fig. 1, and for this purpose I have provided a lifting clutch mechanism which is a modification of the type illustrated in Fig. 1 in that it comprises a lifting lever 130, formed through one end portion thereof with a hole slidably containing the plunger and through which the plunger may move freely when the lever rests flatly against the top surface of the guide bearing 125. However, the hole is of such close diameter that any lifting of the outer end of the lever will cause the plunger to be gripped and lifted. A spring 131 is held under compression between the clutch lever and the bearing 126 to hold the clutch lever disengaged when no lifting is being done, and another spring 132 is contained at one end in a bore in the plunger and is held under compression, bearing against a stop 133, thus to urge the plunger downwardly when the clutch is released, for seating the stud. A collar or nut 135 on the upper end of the plunger engages the bearing 126 to limit the downward travel of the plunger.

Threaded through the outer end of the lever 130 is a downwardly extending stud 140 equipped at its lower end with a ball 141. The stud may be adjusted in the lever and is held in adjustment by a lock nut 142 threaded thereon.

Contained within the gun housing is a constant speed electric motor 145 having its shaft 146 adapted to be operatively connected with a shaft 147 through the energization of a magnetic clutch 150. As here shown, the clutch has circuit connections 151 and 152 with a source of current supply under control of switch 62a, corresponding to switch 62 of the gun of Fig. 1. On the shaft 147 is a worm 157 which drives a gear 158 fixed on a cam shaft 159. Mounted on the cam shaft is a cam 160 arranged for contacting the ball 141 carried by the clutch lever 130 for the purpose of lifting the lever and the plunger. Also, fixed on the shaft 159 are two switch operating cams 163 and 164. The cam 163 controls the movement of a switch lever 165 that closes a switch 166 to supply current for establishing the pilot arc, while cam 164 controls a switch lever 167 that closes a switch 168 to supply welding current to the stud.

The diagram shows a suitable source of A. C. or D. C. current at 170, supplied by lines 171 and 172. The line 171 leads to one side of switch 166. The other line 172 leads to ground through a variable resistance. The other side of switch 166 has connection through a wire 173 grounded on the stud holder. Also, the switch 168 controls flow of current from one side of the secondary of a welding transformer 176 through line 177 to the stud holder; the other side of the transformer being grounded.

The cycle of operation in use of this device, briefly described, would be as follows:

When the operator is ready to weld, the switch 62a on the handle of the gun is closed, thus energizing the magnetic clutch 150 and causing the constant speed motor 145 to drive the gear wheel 158 which drives the cam shaft 159. The ball 141 at the end of the clutch lever 130 will be engaged by the cam 160 to lift the lever and thus lift the plunger and move the stud from the plate. Before the stud is lifted, the cam 163 has been so rotated as to cause the switch lever 165 to close the switch 166 and cause current to flow through the stud. Then, when the stud is lifted, the pilot arc is established between stud and plate. An instant later, the cam 164 causes lever 167 to close the switch 168, to cause welding current to flow.

The arcing period is governed by the width of the arc on the cam 164 and by use of an adjustable cam, this is so adjusted that it closes its switch 168 after the ball has just passed over the rounded corner $x$ of the cam. The effective arc of cam 160 is less than the arc of cam 164 so the stud will be gently lowered as the ball passes over the rounded end of the arc, with the welding current still flowing. Switch 168 is opened by cam 164 after the stud is lowered into the molten pool. Cam 163 then opens the switch 166 and the pilot arc circuit. Switch 62a opens the circuit to clutch 150.

Figure 6:
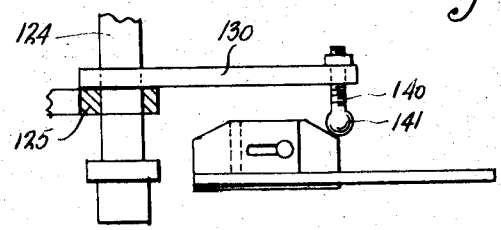
Fig. 6 is a modified form of timing cam for this mechanism.

In the detail illustrated in Fig. 6, I have shown a sliding cam that may be employed in lieu of the rotating cam for controlling the action of the plunger. In this view, the cam is reciprocally moved and it has inclined surfaces at opposite ends to engage with the ball to effect the same action of the plunger as is accomplished by the rotating cam. Provision is made for extending the length of the cam so that the timing may be governed to an exact interval.

In view of the statements in the foregoing specification, it is quite readily apparent that the weight and bulk of the welding gun may be materially reduced in comparison to the size and weights of guns now being used for the same purpose. By use of the alternating current generator, equipment used for the supplying of current may be materially reduced, thus enabling the equipment to be easily transported from place to place and thus avoiding long leads for the welding operation.

Having thus described my invention, what I claim as new therein and desire to secure by Letters Patent is:

1. A gun for the arc welding of studs to plates comprising a housing with plate engaging supports, a plunger slidable in the housing, a stud holder fixed to the plunger, pressure means acting against the plunger to urge a stud applied to the holder against the plate, a clutch member associated with the plunger and through which the latter may be freely lifted through the mediacy of the stud in seating the housing against the plate, and means in the housing operable against the clutch member to lift the plunger.

2. A gun for the arc welding of studs to plates comprising a portable housing equipped with plate engaging supports, a plunger slidably mounted in the housing and held thereby perpendicular to the plate when the supports are engaged against the plate, a stud holder fixed to the plunger, a spring acting against the plunger to urge the stud applied to the holder against the plate, a clutch member support in the housing, a clutch member normally resting on said support and containing the plunger therein for free lifting movement when actuated through mediacy of the stud in functionally engaging the gun with the plate, and an electrically energized means in the housing operable to lift the clutch member a predetermined distance; said clutch member being adapted, when so lifted, to grip the plunger and lift it accordingly to space the stud from the plate.

3. A gun for the arc welding of studs to plates comprising a portable housing equipped with plate engaging supports, a plunger slidably mounted in the housing and held thereby perpendicular to to the plate when the supports are engaged against the plate, a stud holder fixed to the plunger, a spring acting against the plunger to urge the stud applied to the holder against the plate, a clutch member support in the housing, a clutch member normally resting on said support and containing the plunger therein for free lifting movement when actuated through mediacy of the stud in functionally engaging the gun with the plate, and an electrically energized means in the housing operable to lift the clutch member a predetermined distance; said clutch member being adapted, when so lifted, to grip the plunger and lift it accordingly to space the stud from the plate, and means for returning the clutch member against its support upon de-energization of the lifting means.

4. A gun for the arc welding of studs to plates, comprising a portable housing equipped with plate engaging supports, a plunger slidably contained in the housing and held thereby perpendicular to the plate when the housing supports are applied to the plate, a stud holder fixed to the plunger, pressure means acting against the plunger to press the stud as held in the holder against the plate, a clutch member support in the housing, a clutch member normally resting on the said support, for the free lifting of the plunger therein through the mediacy of the stud and holder in applying the stud and housing against the plate, means in the housing operable to lift the clutch member and thereby lift the plunger and stud accordingly; said clutch member including means operable as a brake to retard the stud seating movement of the plunger on release of the clutch lifting means.

5. A gun as recited in claim 4 wherein the means for lifting the clutch comprises a solenoid that is fixed in the housing and having an armature that is actuated upon energization of the solenoid, and means arranged to be acted upon by the armature in its movement to engage and lift the clutch member.

6. In a gun of the character described, a housing, spaced guides in the housing, a plunger slidable in the guides, a stud holder fixed to the plunger and a lifting means for the plunger comprising a collar normally resting on one of the guides and through which the plunger is slidable when upwardly adjusted through the mediacy of the stud and holder, a lever arm pivoted in the collar and equipped at its inner end with a clutch head and means in the housing operable to engage and lift the outer end of the lever arm a predetermined distance to cause said clutch head to grip and effect the lifting of the plunger accordingly.

7. A gun as recited in claim 6 wherein the said clutch head frictionally engages against the plunger and operates as a brake on the latter in its movement to seat the stud upon retraction of the lever lifting means, and wherein springs act against the plunger and against the clutch collar to reseat them after a lifting operation and upon retraction of the lever lifting means.

8. In an apparatus for welding a stud, forming one electrode of a welding circuit and a plate forming the other electrode of the circuit; a stud holder, means acting yieldingly against the holder to urge the stud against the plate, electrically energizable means for lifting the holder to space the stud from the plate, an electric circuit for an arc initiating current including the plate, stud and said electrically energizable means therein, a transformer, a source of current supply for the primary winding of the transformer, a welding circuit including the secondary winding of the transformer, the plate and the stud therein, a constant speed motor, a cam shaft, an electrically energized clutch for effecting a driving connection between the motor and cam shaft, a normally open switch in the arc initiating circuit, a normally open switch in the welding circuit, and cams on the cam shaft operable to effect a timed closing and opening of said switches.

9. In an apparatus for welding a stud, forming one electrode of a welding circuit, to a plate forming the other electrode of the circuit; a circuit for an arc initiating current including the plate, stud and electrically energizable means therein, a normally open switch in the circuit, an alternating current transformer, a supply circuit including the primary winding of the transformer therein, a welding circuit including the secondary winding of the transformer, the stud and plate therein, normally open switches in the supply circuit and welding circuit, and switch timing means for closing and opening the circuit for the arc initiating current, and for closing and opening the supply circuit and welding circuit switches.

10. An apparatus as recited in claim 9 wherein the timing means for the said switches are synchronized in a manner whereby to close the welding circuit after the arc initiating circuit has been closed and to open it after the arc initiating circuit has been opened and the stud seated against the plate.

11. In a welding apparatus of the character described, a gun housing having plate engaging legs, a plunger slidable in the housing, a stud holder on the plunger, a spring acting against the plunger to urge the stud against the plate, a one-way clutch lever applied to the plunger for lifting the same to space the stud from the plate, a cam shaft, a constant speed motor, a clutch adapted to be electrically energized to operatively connect the motor and cam shaft, a circuit for the clutch, a manual switch in the circuit, an alternating current transformer, means supplying current to the primary winding of the transformer, a circuit for an arc initiating current including the stud, and plate therein, a circuit for welding current including the secondary winding of the transformer, stud and plate therein, a timing cam on the cam shaft to lift the plunger to space the stud from the plate, switches in the arc initiating and welding circuits, cams on the cam shaft for timing and synchronizing the closing and opening of these switches with the closing and opening of the first switch.

GROVER A. HUGHES.